United States Patent
Broussard (10) Patent No.: US 10,215,535 B2
(45) Date of Patent: Feb. 26, 2019

(54) SYSTEM, METHOD, AND ASSEMBLY FOR ADAPTIVELY SHIELDING A STRUCTURE

(71) Applicant: THE BOEING COMPANY, Chicago, IL (US)

(72) Inventor: Steven R. Broussard, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 651 days.

(21) Appl. No.: 14/663,672

(22) Filed: Mar. 20, 2015

(65) Prior Publication Data

US 2016/0273885 A1 Sep. 22, 2016

(51) Int. Cl.
| | |
|---|---|
| F41H 5/007 | (2006.01) |
| G01S 17/66 | (2006.01) |
| F41H 7/04 | (2006.01) |
| G01S 13/66 | (2006.01) |

(52) U.S. Cl.
CPC .............. *F41H 5/007* (2013.01); *G01S 17/66* (2013.01); *F41H 7/04* (2013.01); *G01S 13/66* (2013.01)

(58) Field of Classification Search
CPC .......... F41H 55/007; F41H 7/04; G01S 13/66; G01S 17/66
USPC ....................................................... 89/36.01
See application file for complete search history.

(56) References Cited

U.S. PATENT DOCUMENTS

| | | | | | |
|---|---|---|---|---|---|
| 5,577,432 | A | * | 11/1996 | Becker | F41H 5/007 89/36.17 |
| 5,915,291 | A | * | 6/1999 | Weihrauch | F41B 6/003 124/3 |
| 6,622,608 | B1 | * | 9/2003 | Faul | B82Y 25/00 89/36.02 |
| 6,758,125 | B1 | * | 7/2004 | Zank | F41H 5/007 89/36.17 |
| 7,104,178 | B1 | * | 9/2006 | Zank | F41H 5/007 89/36.02 |
| 7,222,562 | B2 | * | 5/2007 | Smiley | F41H 7/04 296/136.02 |
| 7,551,419 | B2 | * | 6/2009 | Pelrine | H02N 13/00 361/234 |
| 7,598,651 | B2 | * | 10/2009 | Kornbluh | B64C 3/48 310/309 |
| 7,598,652 | B2 | * | 10/2009 | Kornbluh | B64C 3/48 310/309 |

(Continued)

OTHER PUBLICATIONS https://web.archive.org/web/20140715201548/https://www.electronics-tutorials.ws/electromagnetism/electromagnetism.html[Feb. 19, 2018 8:46:12 PM].*

(Continued)

*Primary Examiner* — Michelle Clement (74) *Attorney, Agent, or Firm* — Joseph M. Butscher; The Small Patent Law Group, LLC (57) ABSTRACT

A system for adaptively shielding a structure includes an armor assembly including one or more armor modules. Each armor module may include one or more electromagnets coupled to a housing that retains a plurality of shielding particles. The electromagnet(s) are configured to be activated in response to an impending threat of a projectile impact. The shielding particles are attracted to the one or more electromagnets to form a shielding barrier in response to activation of the electromagnet(s). The shielding barrier is configured to absorb at least a portion of a force of the projectile impact.

20 Claims, 4 Drawing Sheets

(56) References Cited

U.S. PATENT DOCUMENTS

| | | | | |
|---|---|---|---|---|
| 7,730,823 | B1 * | 6/2010 | Fullerton | F41H 5/007 89/36.17 |
| 7,770,506 | B2 * | 8/2010 | Johnson | F41H 5/0457 89/36.09 |
| 7,946,211 | B1 * | 5/2011 | Winchester | B29C 70/70 89/36.17 |
| 8,006,607 | B2 * | 8/2011 | Wickert | F41H 5/007 109/34 |
| 8,151,685 | B2 * | 4/2012 | Joynt | F41H 5/023 89/36.02 |
| 8,436,508 | B2 * | 5/2013 | Kornbluh | B64C 3/48 310/309 |
| 8,453,553 | B2 * | 6/2013 | Cannon | F41H 5/007 89/36.17 |
| 9,121,663 | B2 * | 9/2015 | Troy | F41C 23/14 |
| 9,347,746 | B1 * | 5/2016 | Andrews | F41H 5/0492 |
| 9,374,884 | B2 * | 6/2016 | Mitra | H05H 1/48 |
| 2004/0118273 | A1 * | 6/2004 | Zank | F41H 5/007 89/36.17 |
| 2006/0011054 | A1 * | 1/2006 | Walthall, III | F42D 5/045 86/50 |
| 2006/0186700 | A1 * | 8/2006 | Browne | B60J 7/04 296/187.01 |
| 2007/0044646 | A1 * | 3/2007 | Smiley | F41H 7/04 89/36.07 |
| 2007/0137471 | A1 * | 6/2007 | Mazur | F41H 5/013 89/36.02 |
| 2008/0075930 | A1 * | 3/2008 | Kornbluh | B64C 3/48 428/189 |
| 2010/0007240 | A1 * | 1/2010 | Kornbluh | B64C 3/48 310/309 |
| 2010/0178887 | A1 * | 7/2010 | Millam | H04B 1/034 455/128 |
| 2011/0197899 | A1 * | 8/2011 | Rogers | A61F 11/08 128/864 |
| 2011/0205101 | A1 * | 8/2011 | Mardirossian | F41H 11/02 342/14 |
| 2012/0160085 | A1 * | 6/2012 | Dean | F41H 5/007 89/36.02 |
| 2012/0181896 | A1 * | 7/2012 | Kornbluh | B64C 3/48 310/300 |
| 2014/0007761 | A1 * | 1/2014 | Haidar | F41H 7/042 89/36.02 |
| 2014/0186550 | A1 * | 7/2014 | Cooper | C01B 32/164 427/577 |
| 2014/0227548 | A1 * | 8/2014 | Myrick | C06B 45/30 428/570 |
| 2015/0219425 | A1 * | 8/2015 | Beckman | F41H 5/00 89/1.11 |
| 2015/0305132 | A1 * | 10/2015 | Mitra | H05H 1/48 313/231.31 |
| 2016/0109206 | A1 * | 4/2016 | Beckman | F41H 5/007 434/16 |

OTHER PUBLICATIONS https://web.archive.org/web/20140715175203/https://www.electronics-tutorials.ws/electromagnetism/electromagnets.html[Feb. 19, 2018 8:59:26 PM].*

* cited by examiner

SYSTEM, METHOD, AND ASSEMBLY FOR ADAPTIVELY SHIELDING A STRUCTURE

FIELD OF THE DISCLOSURE

Embodiments of the present disclosure generally relate to systems, methods, and assemblies for adaptively shielding a structure, such as a vehicle, a fixed station or building, or body armor.

BACKGROUND OF THE DISCLOSURE

Various structures include armor to shield against projectiles, collisions with other structures, and the like. As one example, armored cars are used to transport valuable items, such as large amounts of money, commodities, jewelry, and the like. Further, in military applications, various vehicles, and stationary structures (such as fixed weapons installations, radar stations, and the like) include outer armor to protect the structures from projectiles, such as bullets, missiles, bombs, shrapnel, and the like.

Typically, structures include armor panels that are secured to a frame or main body. The armor panels are designed to protect against specific threats, but are also heavy and bulky. As such, known armor adds weight and cost to a structure. In aircraft in particular, the added weight of the armor panels decreases fuel efficiency and flight range.

Also, known armor is passive in that it remains in a fixed position with respect to a structure. That is, once armor plates are secured to a structure, the armor plates remain in position unless they are physically removed (or damaged by a projectile). If an armor panel is damaged by a projectile, the entire armor panel is typically removed and replaced, which is time-consuming and expensive. Further, in various settings, the fixed armor plates may not be necessary to protect the structure. Instead, the heavy, bulky armor plates simply add size and weight to the structure.

Accordingly, a need exists for light, efficient, and dynamic armor that may be operatively connected to a structure.

SUMMARY OF THE DISCLOSURE

Certain embodiments of the present disclosure provide a system for adaptively shielding a structure. The system may include an armor assembly including one or more armor modules. Each armor module may include one or more electromagnets coupled to a housing that retains a plurality of shielding particles. The electromagnet(s) are configured to be activated in response to an impending threat of a projectile impact. The shielding particles are attracted to the electromagnet(s) to form a shielding barrier in response to activation of the electromagnet(s). The shielding barrier is configured to absorb at least a portion of a force of the projectile impact.

The system may also include a projectile tracking sub-system including one or more sensors that are configured to detect a projectile and determine a location of the projectile impact. The projectile tracking sub-system and/or the armor assembly may include at least one control unit that is configured to determine the location of the projectile impact and/or activate the electromagnet(s) proximate to the location of the projectile impact. The control unit(s) is configured to selectively activate and deactivate the electromagnet(s) based on a presence of the impending threat of the projectile impact. The sensor(s) may include one or more of a radar sensor, a heat sensor, or an optical sensor.

In at least one embodiment, armor modules cover or form an exterior of the structure. Further, each armor module may include a plurality of electromagnets. The shielding particles may include a plurality of magnetic metal particles.

The structure may be an aircraft, a land vehicle, a water vehicle, a fixed station, body armor configured to be worn by an individual, etc.

Certain embodiments of the present disclosure provide a method of adaptively shielding a structure. The method may include activating one or more electromagnets in response to an impending threat of a projectile impact, attracting a plurality of shielding particles to the electromagnet(s) in response to the activating operation, and forming a shielding barrier with the plurality of shielding particles through the attracting operation. The shielding barrier is configured to absorb at least a portion of a force of the projectile impact. The method may also include detecting a presence of a projectile in a vicinity of the structure with one or more sensors, and determining a location of the projectile impact based on the detecting operation. The activating operation may include activating the electromagnet(s) proximate to the location of the projectile impact. The method may include selectively activating and deactivating the electromagnet(s) based on a presence of the impending threat of the projectile impact.

Certain embodiments of the present disclosure provide a system that includes a structure, and an armor assembly including a plurality of armor modules covering or forming an exterior of the structure. The system may also include a projectile tracking sub-system including one or more sensors that are configured to detect a projectile and determine a location of the projectile impact.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an armor assembly that may include one or more armor modules. Each armor module may include one or more electromagnets that may be selectively energized in response to the presence of an impending threat, such as an incoming projectile that may impact the structure in a short period of time (e.g., within one minute, less than 10 seconds, less than 2 seconds, and so on). In response to being energized, the electromagnet attracts a plurality of shielding particles, such as metal powder particles, that magnetically coalesce (for example, fuse, harden, or the like) in front of the electromagnet to form a shielding barrier at a point of impact.

An active identification system, such as a projectile tracking sub-system, may determine a location of a projectile and determine an impending location of the point of impact. The active identification system may be in communication with the armor assembly, which activates one or more electromagnets at the determined/predicted point of impact before the projectile contacts the armor assembly. When the electromagnet(s) are activated, the shielding particles coalesce proximate to the activated electromagnet(s), thereby creating a zone of armor to prevent the projectile from penetrating into the structure. In response to the threat (for example, the projectile) abating, the electromagnet(s) are deactivated, which decouples the shielding particles from one another proximate to the electromagnet(s). As such, the shielding particles may decouple from one another and collect in a retaining area, for example.

Embodiments of the present disclosure provide an armor assembly that is reusable, and may be used with a variety of threats. Further, embodiments of the present disclosure provide a lightweight, efficient system and method of shielding a structure.

In at least one embodiment, a system is configured to shield a vehicle, such as an aircraft, from incoming threats. The system may include an array of armor modules, each of which may include one or more electromagnets. In operation, one or more of the electromagnets may be energized (such as through current delivered to the electromagnets) in response to an actual or imminent threat of a projectile strike. In response to the electromagnet(s) being energized, magnetic material within the shielding particles is attracted to the energized electromagnet(s), thereby coalescing together proximate to the energized electromagnet(s).

Because the armor modules may be arranged in an array, individual electromagnets within the array may be energized, or multiple modules within a zone may be energized in response to the threat. If a projectile strikes an electromagnet, the damaged electromagnet may be replaced.

The structures may be any structure that is to be shielded from one or more threats, such as incoming projectile (for example, bullets, missiles, bombs, shrapnel, natural projectiles such as broken tree limbs in a violent thunder storm, or the like). For example, the structures may be or include vehicles, buildings, fixed stations or facilities, body armor, or the like. In at least one embodiment, the systems, methods, and assemblies described in the present application may be used with respect to aircraft.

Figure 1:
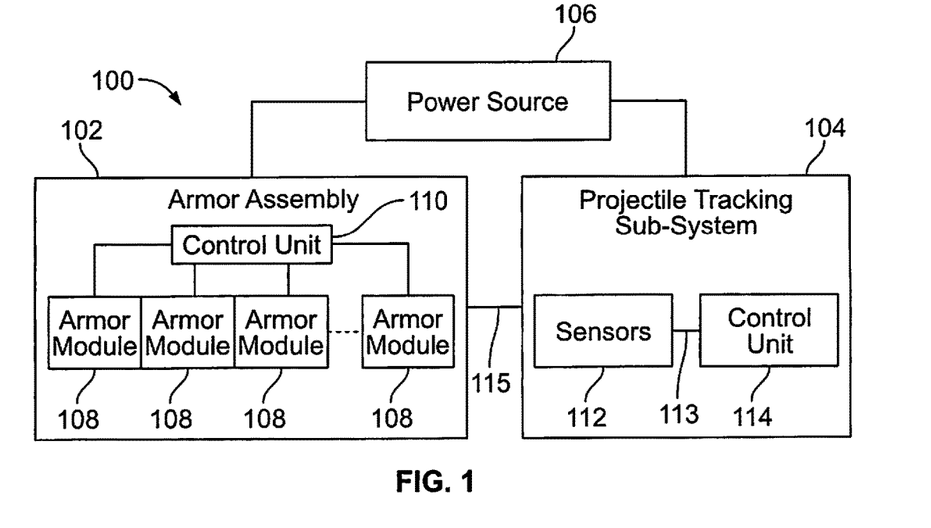
FIG. 1 illustrates a schematic block diagram of a system for adaptively shielding a structure, according to an embodiment of the present.

FIG. 1 illustrates a schematic block diagram of a system 100 for adaptively shielding a structure, according to an embodiment of the present. The system 100 may include an armor assembly 102 that may be operatively coupled to a projectile tracking sub-system 104, such as through one or more wired or wireless connections. A power source 106 may be operatively connected to both the armor assembly 102 and the projectile tracking sub-system 104. For example, the power source 106 may be a battery, a generator, an engine, and/or the like. Optionally, each of the armor assembly 102 and the projectile tracking sub-system 104 may be powered through a separate and distinct power source.

The armor assembly 102 may include a plurality of armor modules 108. More or less armor modules 108 than shown may be used. The armor modules 108 cover and/or form an exterior surface of a structure. For example, the armor modules 108 may cover and/or form an entire exterior surface of a structure. Optionally, the armor modules 108 may cover and/or form lesser portions of the structure, such as those areas that may be susceptible to threats of projectiles.

The armor modules 108 may be operatively coupled to a control unit 110, such as through one or more wired or wireless connections. The control unit 110 is configured to selectively activate and deactivate one or more electromagnets of the armor modules 108 in response to a threat of a projectile detected by the projectile tracking sub-system 104.

The projectile tracking sub-system 104 may include one or more sensors 112 operatively coupled to a control unit 114, such as through one or more wired or wireless connections. The projectile tracking sub-system 104 may be configured to detect and track projectiles through one or more of radar, heat sensing, optics, and/or the like. For example, the sensors 112 may be radar sensors, optical sensors, heat sensors, and/or the like.

In response to a projectile moving toward the structure, the sensor(s) 112 detect the presence of the projectile and send a projectile sensing signal 113 to the control unit 114. The control unit 114 determines the position of the projectile and, based on movement of the projectile within a medium (such as air, water, or space, for example), determines an impact location and/or time of impact in relation to the structure. For example, based on the position, velocity, and acceleration of the projectile detected by the sensor(s) 112, the control unit 114 may determine an impact location and remaining time until impact.

The control unit 114 may send an impact signal 115 to the control unit 110 of the armor assembly 102. In response, the control unit 110 of the armor assembly 102 activates one or more electromagnets of one or more armor modules 108 at the point of impact (e.g., a predicted point of an impending impact) determined by the control unit 114 of the projectile tracking sub-system 104. In response to being activated, the electromagnet(s) attract magnetic shielding particles that coalesce together proximate to the activated electromagnet(s) to form a shielding barrier. The shielding barrier eliminates, minimizes, mitigates, cushions, or otherwise reduces the force of the impact of the projectile with respect to the structure. For example, the shielding barrier absorbs at least a portion of the force of the impact of the projectile. After the projectile is no longer a threat to the structure (for example, when the threat has abated either by missing the structure or the extent of the impact is complete), the control unit 110 deactivates the electromagnet(s) of the armor module(s) 108, thereby decoupling the shielding particles from one another (which may allow the shielding particles to fall back into a retainer, such as a tray, channel, trough, bucket, cuff, sleeve, or the like).

As shown, each of the armor assembly 102 and the projectile tracking sub-system 104 may include separate and distinct control units 110 and 114, respectively. Optionally, a single control unit may be operatively coupled to both the armor assembly 102 and the projectile tracking sub-system 104 and be configured to perform the operations of the control units 110 and 114 described above.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor capable of executing the functions described herein. Such are exemplary only, and are thus not intended to limit in any way the definition and/or meaning of such terms.

The control unit executes a set of instructions that are stored in one or more storage elements (such as one or more memories), in order to process data. For example, each control unit may include one or more memories. The storage elements may also store data or other information as desired or needed. The storage element may be in the form of an information source or a physical memory element within a processing machine.

The set of instructions may include various commands that instruct the control unit (which may be or include a computer or processor) as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control or processing units (such as the control units 110 and 114). It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
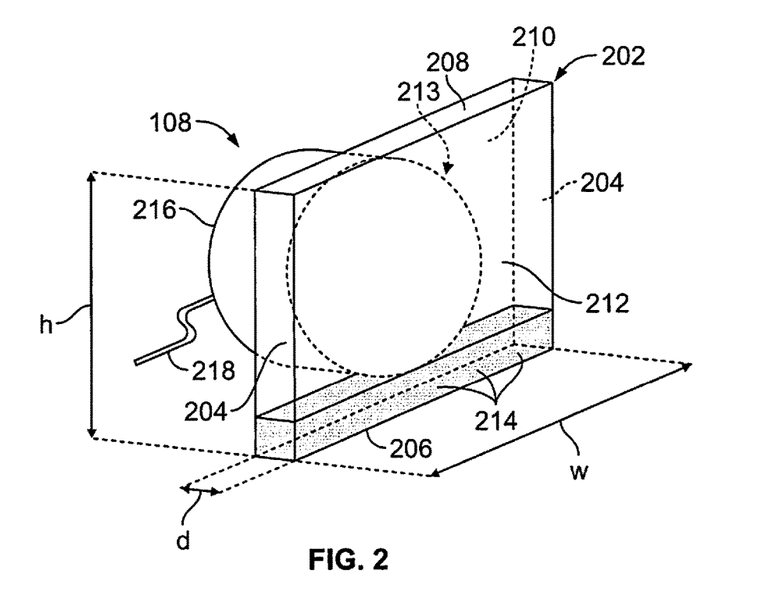
FIG. 2 illustrates a perspective front view of an armor module, according to an embodiment of the present disclosure.

FIG. 2 illustrates a perspective front view of an armor module 108, according to an embodiment of the present disclosure. The armor module 108 may include a housing 202 that may include lateral panels 204 connected to a bottom panel 206, a top panel 208, a rear panel 210, and a front panel 212. An internal shielding chamber or cavity 213 is defined between the lateral panels 204, the bottom panel 206, the top panel 208, the rear panel 210, and the front panel 212. The housing 202 may be formed of a non-magnetic material, such as plastic, glass, plexiglass, rubber, or the like.

The housing 202 retains a plurality of shielding particles 214. The shielding particles 214 may be magnetized metal particles, such as titanium, steel, aluminum, iron, ceramic-covered metal, and/or the like. Each shielding particle 214 may be a small cube, chip, flake, or the like having dimensions on the order of 0.01"×0.01"×0.01". Optionally, the dimensions of each shielding particle 214 may be greater or less than 0.01"×0.01"×0.01". In at least one embodiment, the shielding particles 214 combine to form a magnetic metal powder, such as a powder of iron fillings, whiskers, clippings, and/or the like.

The shielding particles 214 may be retained within the internal shielding chamber 213 within a vacuum. Optionally, the internal shielding chamber 213 may be filled with a fluid, such as air, liquid, gel, or the like, and the shielding particles 214. For example, in a decoupled state, the internal shield chamber 213 may suspend the shielding particles within a liquid or gel.

An electromagnet 216 may be secured to an outer surface of the rear panel 210 opposite from the front panel 212. For example, the electromagnet 216 may be secured to the rear panel 210 through bonding, adhesives, fasteners, or the like. Optionally, a front face of the electromagnet 216 may form a wall that replaces the rear panel 210 or a portion thereof. The electromagnet 216 may be operatively connected to a power input 218, such as a wire, cable, lead, or the like. The power input 218 is operatively connected to a power source and/or control unit, which selectively activates and deactivates the electromagnet 216, such as through selectively delivering and ceasing electrical current to the electromagnet 216.

The electromagnet 216 may have a circular axial cross-section and a flat front face. Alternatively, the electromagnet 216 may be various other shapes and sizes, such as square, rectangular, triangular, and/or the like. Each electromagnet 216 may have a diameter of between 1"-5". Optionally, the diameter of each electromagnet 216 may be less than 1" or greater than 5".

As shown in FIG. 2, the electromagnet 216 is deactivated. When the electromagnet 216 is deactivated, the shielding particles 214 are retained within a retaining portion of the housing 202. For example, the shielding particles 214 are retained at the bottom of the housing 202 supported by the bottom panel 206 between the lateral panels 204, the front panel 212, and the rear panel 210. When the electromagnet 216 is deactivated, the shielding particles 214 are decoupled from one another. That is, the shielding particles 214 are not magnetically attracted to one another or the electromagnet 216. Instead, the shielding particles 214 may slide or otherwise move relative to one another without magnetically coalescing together.

As shown in FIG. 2, the shielding particles 214 are retained within the bottom of the housing 202. However, depending on the orientation of the armor module 108 in relation to a structure, the shielding particles 214 may be retained at other portions. The terms bottom, top, front, and lateral are used merely in relation to the orientation of the armor module 108 as shown in FIG. 2. For example, if the armor module 108 is oriented such that the rear panel 210 is proximate to ground, the shielding particles 214 may congregate and be retained on an interior surface of the rear panel 210.

While the armor module 108 is shown having a single electromagnet 200, the armor module 108 may include more electromagnets. For example, the armor module 108 may include an array of twenty electromagnets. In at least one other embodiment, the array may include more or less than twenty electromagnets.

Each armor module 108 may have a width w of 10", a height h of 6", and a depth d of 1", whether a single electromagnet or multiple electromagnets are used. Optionally, the width w may be greater or lesser than 10", the height h may be greater or less than 6", and the depth d may be greater or lesser than 1".

Figure 3:
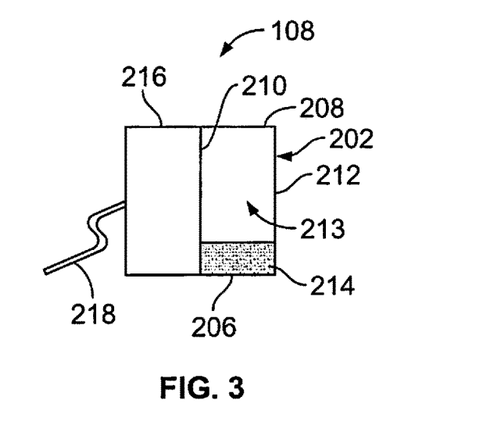
FIG. 3 illustrates a lateral view of an armor module in which an electromagnet is deactivated, according to an embodiment of the present disclosure.

FIG. 3 illustrates a lateral view of the armor module 108 in which the electromagnet 216 is deactivated, according to an embodiment of the present disclosure. As shown, the shielding particles 214 are settled at the bottom of the internal shielding chamber 213 and are dispersed or otherwise decoupled from one another. In the decoupled state, the shielding particles 214 may settle (for example, gravitate) into a pile that is supported by the bottom panel 206, for example. In the decoupled state, the shielding particles 214 may be in a reduced potential energy state. That is, potential energy U=mgh, in which m is a mass of each shielding particle, g is gravitational force, and h is height. Because the shielding particles gravitate toward a lower portion of the housing 202 in the decoupled state, the height h of each shielding particle is at a minimum. As such, the shielding particles 214 as a whole are at a low level, and therefore are at a reduced potential energy state.

Figure 4:
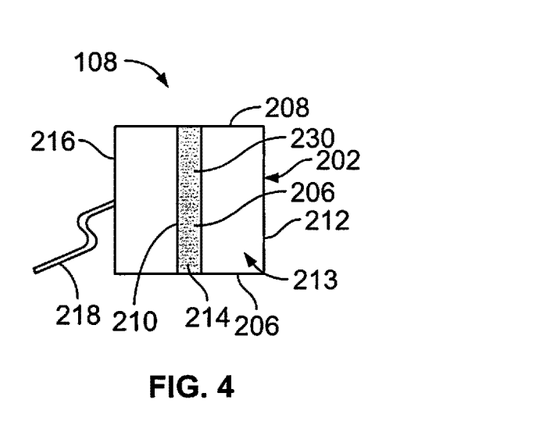
FIG. 4 illustrates a lateral view of an armor module in which an electromagnet is activated, according to an embodiment of the present disclosure.

FIG. 4 illustrates a lateral view of the armor module 108 in which the electromagnet 216 is activated, according to an embodiment of the present disclosure. In response to the electromagnet 216 being activated, the shielding particles 214 are attracted to the front face of the electromagnet 216 and coalesce with one another and form a shielding barrier 230 proximate to the front face of the electromagnet 216. For example, the shielding particles 214 coalesce and magnetically couple to (for example, attach to) the front face of the electromagnet 216 on an interior surface of the rear panel 210. Optionally, if the front face of the electromagnet replaces the rear panel 210 (or a portion thereof) such that it is exposed within the chamber 213, the shielding particles 214 coalesce and magnetically couple directly to the front face of the electromagnet 216. In the coupled state, as shown in FIG. 4, the formed shielding barrier 230 is defined by the coalesced and magnetically coupled shielding particles 214. In the coupled state, the shielding particles 214 may be in a maximum or increased potential energy state. Because the shielding particles coalesce at an increased height h within the housing 202 in the coupled state, the height h is of each shielding particle may be at an increased height in comparison to its position in a decoupled state. As such, the shielding particles 214 as a whole may be at increased level, and therefore may be at an increased potential energy state.

When the electromagnet 216 is activated, thereby attracting the shielding particles 214, the shielding barrier 230 is formed by the coalesced shielding particles. As such, the shielding barrier 230 provides a rigid, hard, and robust protective barrier that is configured to reduce a force of impact of a projectile with respect to the structure. For example, the shielding barrier 230 is configured to absorb and/or disperse at least a portion of the force of impact of the projectile.

Figure 5:
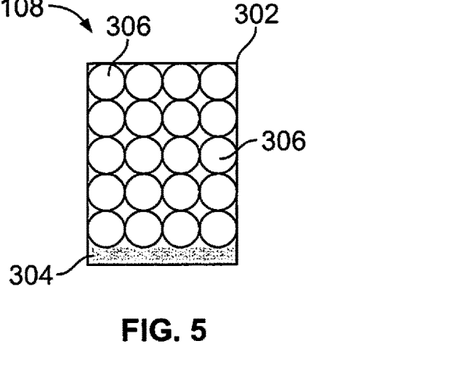
FIG. 5 illustrates a front view of an armor module, according to an embodiment of the present disclosure.

FIG. 5 illustrates a front view of an armor module 108, according to an embodiment of the present disclosure. The armor module 108 includes a housing 302 that retains a plurality of shielding particles 304, and a plurality of electromagnets 306. As shown, the armor module 108 may include an array of twenty electromagnets 306. Optionally, the armor module 108 may include more or less than twenty electromagnets 306.

As shown in FIG. 5, a threat of a projectile is not detected, such as by the projectile tracking sub-system 104 (shown in FIG. 1). Accordingly, the electromagnets 306 are deactivated, and the shielding particles 304 are settled at the bottom of the housing 302 in a decoupled state.

Figure 6:
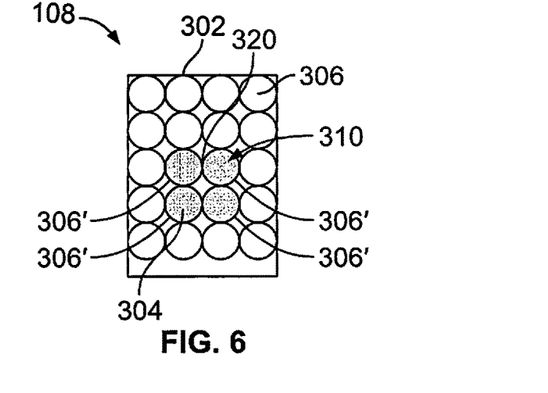
FIG. 6 illustrates a front view of an armor module in response to a projectile tracking sub-system determining an impact location of a projectile, according to an embodiment of the present disclosure.

FIG. 6 illustrates a front view of the armor module 108 in response to the projectile tracking sub-system determining an impact location 310 of a projectile, according to an embodiment of the present disclosure. As shown, the impact location 310 may be proximate to a center of the armor module 108. In response to receiving an impact signal that indicates the location of the impact location 310, the electromagnets 306' proximate to the impact location 310 are activated, thereby magnetically attracting the shielding particles 304 to coalesce and couple together in relation to the activated electromagnets 306'. The coalesced shielding particles 304 form a shielding barrier 320 that is configured to reduce the impact of the force of the incoming projectile.

Figure 7:
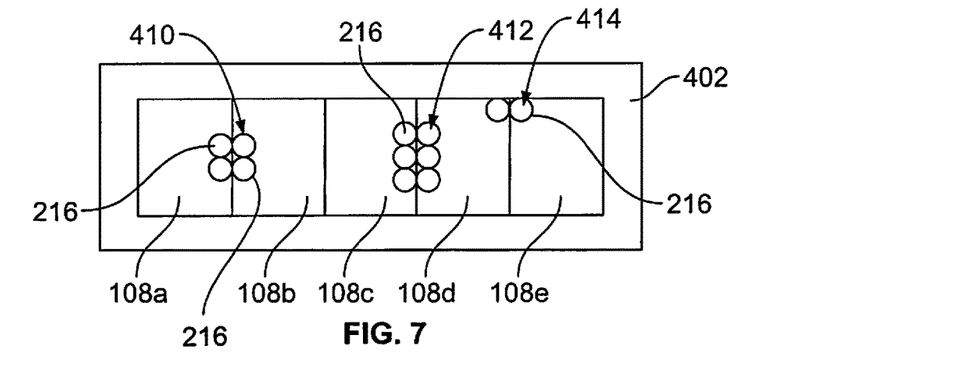
FIG. 7 illustrates a simplified front view of a plurality of armor modules secured to a structure, according to an embodiment of the present disclosure.

FIG. 7 illustrates a simplified front view of a plurality of armor modules 108a, b, c, d, and e secured to a structure 402, according to an embodiment of the present disclosure. The armor module 108a may abut against the armor module 108b, which may, in turn, abut against the armor module 108c, and so on. More or less armor modules than shown may be used. The armor modules 108a-e may cover and/or otherwise form an entire outer surface of the structure 402.

The armor modules 108a-e may cooperate with one another to provide shielding barriers at connection interfaces between the armor modules 108a-e. For example, a projectile tracking sub-system (such as the sub-system 104) may determine impact locations 410, 412, and 414, each of which extends between neighboring armor modules 108a-e. For example, the impact location 410 extends between the armor modules 108a and 108b. The impact location 412 extends between the armor modules 108c and 108d, while the impact location 414 extends between the armor modules 108d and 108e. As such, electromagnets 216 of neighboring armor modules 108a-e may be activated to attract shielding particles to form shielding barriers between neighboring armor modules 108a-e.

Referring to FIGS. 1-7, when any of the electromagnets are damaged, such as through an impact of a projectile, the damaged electromagnets may be replaced, while the armor module remains in service. That is, instead of replacing an entire armor module, only damaged portions may be replaced.

Figure 8:
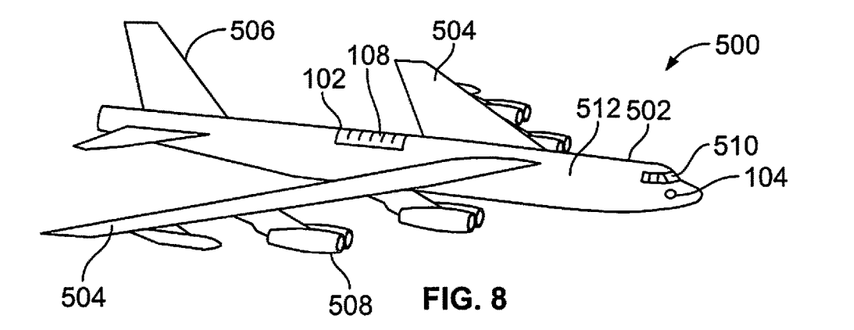
FIG. 8 illustrates a perspective top view of an aircraft that includes an adaptive shielding system, according to an embodiment of the present disclosure.

FIG. 8 illustrates a perspective top view of an aircraft 500 that includes an adaptive shielding system, according to an embodiment of the present disclosure. The aircraft 500 is an example of a structure that may utilize an adaptive shielding system including an armor assembly that may be operatively coupled to and in communication with a projectile tracking sub-system.

The aircraft 500 may include a main body 502 connected to wings 504 and a tail section 506. Engines 508 may be secured to the wings 504, for example. The main body 502 includes a cockpit 510 and a fuselage 512.

At least portions of the aircraft 500 may be covered with an armor assembly 102 including a plurality of armor modules 108, as described above. For example, an entire outer surface of the aircraft 500 may be covered with and/or formed by the armor assembly 102. The armor assembly 102 is operatively coupled to and in communication with a projectile tracking sub-system 104, such as may be secured proximate to the cockpit 510.

Figure 9:
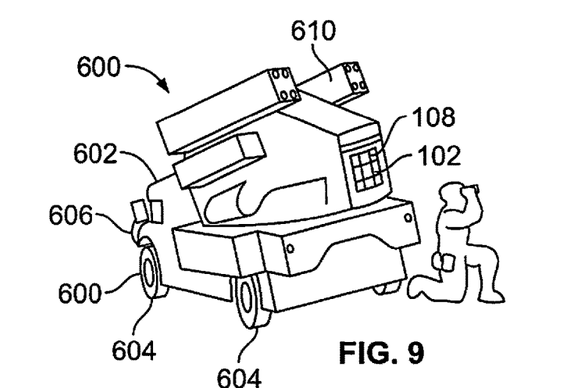
FIG. 9 illustrates a perspective rear view of a tactical land vehicle that includes an adaptive shielding system, according to an embodiment of the present disclosure.

FIG. 9 illustrates a perspective rear view of a tactical land vehicle 600 that includes an adaptive shielding system, according to an embodiment of the present disclosure. The tactical land vehicle 600 is an example of a structure that may utilize an adaptive shielding system including an armor assembly that may be operatively coupled to and in communication with a projectile tracking sub-system.

The tactical land vehicle 600 may include a main body 602 supported by wheels 604. The main body 602 includes a cabin 606. A weapons system 610, such as a missile launcher, is operatively connected to the main body 602.

At least portions of the tactical land vehicle 600 may be covered with an armor assembly 102 including a plurality of armor modules 108, as described above. For example, an entire outer surface of the main body 602 and the weapons system 610 may be covered with and/or formed by the armor assembly 102. The armor assembly 102 is operatively coupled to and in communication with a projectile tracking sub-system, such as may be secured proximate to the cabin 606.

In at least one other embodiment, the structure may be a water craft, such as a battleship, submarine, aircraft carrier, beach landing craft, patrol boat, and/or the like. In at least one other embodiment, the structure may be a space craft, such as a space shuttle, rocket, or the like.

Referring to FIGS. 8 and 9, the structure may be any vehicle that may utilize armor. The vehicle may be a land vehicle, an aircraft, a water vehicle, a spacecraft, or the like. The vehicle may include a main body having an interior cabin (such as a cockpit) that includes operational controls for controlling movement and other operations of the vehicle. An armor assembly, such as any of those described in the present application, may be used to adaptively shield the vehicle from external threats. The armor assembly may cover or otherwise form an exterior surface of the vehicle. A projectile tracking sub-system may be secured within or on the vehicle and is in communication with the armor assembly.

Figure 10:
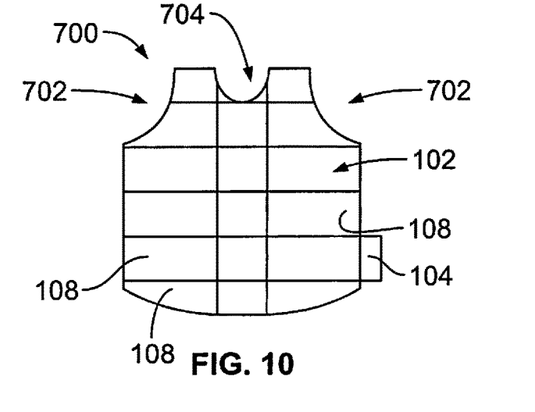
FIG. 10 illustrates a front view of body armor that includes an adaptive shielding system, according to an embodiment of the present disclosure.

FIG. 10 illustrates a front view of body armor 700 that includes an adaptive shielding system, according to an embodiment of the present disclosure. The body armor 700 may be in the form of a protective vest having shoulder openings 702 and a neck opening 704. The body armor 700 is an example of a structure that may utilize an adaptive shielding system including an armor assembly that may be operatively coupled to and in communication with a projectile tracking sub-system.

The body armor 700 may be covered with an armor assembly 102 including a plurality of armor modules 108, such as any of those described above. The armor modules 108 are operatively coupled to and in communication with a projectile tracking sub-system 104, which may be secured to a portion of the body armor 700. For example, the projectile tracking sub-system 104 may be stitched, clipped, or otherwise secured to a portion of the body armor 700.

Figure 11:
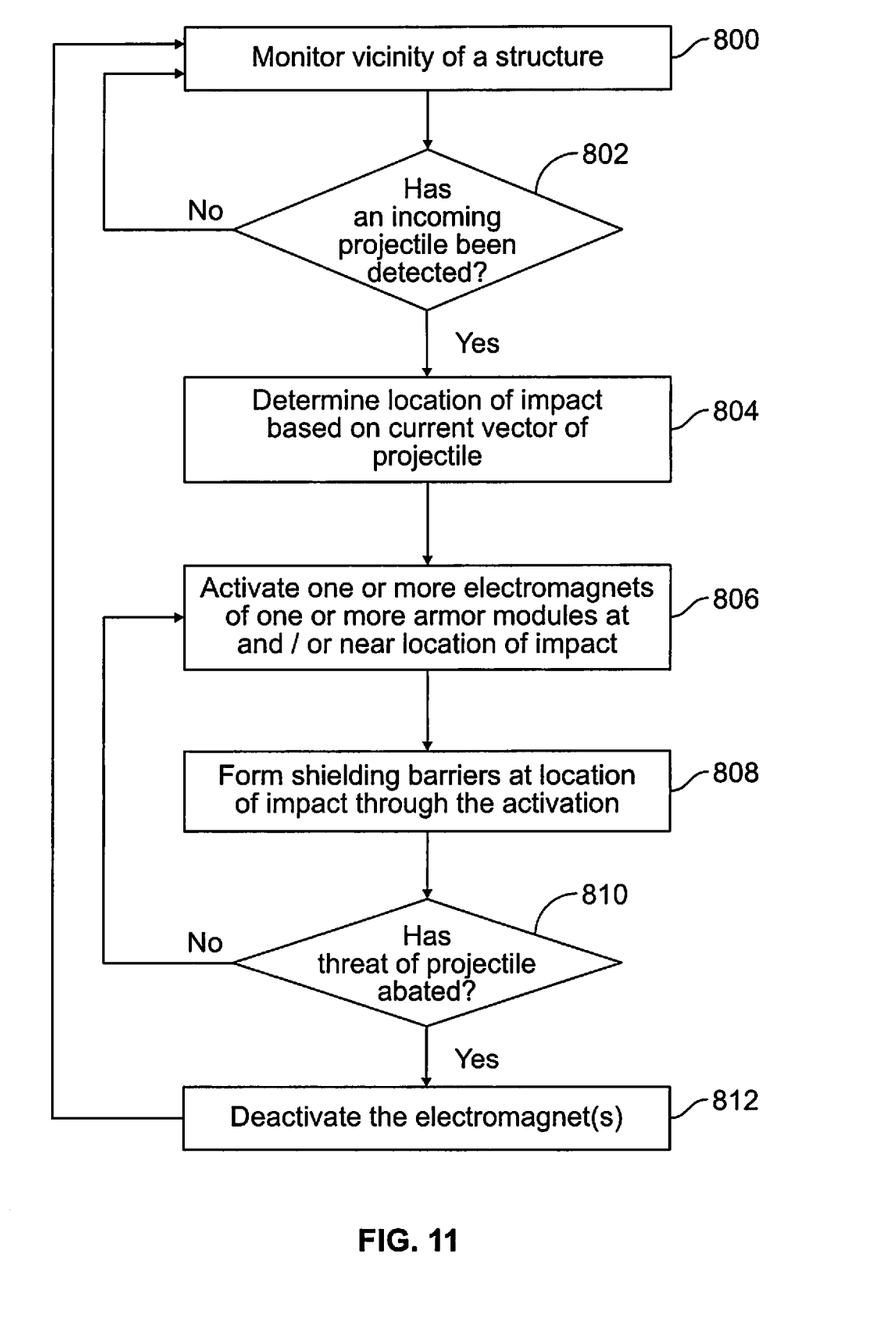
FIG. 11 illustrates a flow chart of a method of adaptively shielding a structure, according to an embodiment of the present disclosure.

FIG. 11 illustrates a flow chart of a method of adaptively shielding a structure, according to an embodiment of the present disclosure. The method begins at 800, in which a vicinity of a structure is monitored. For example, a projectile tracking sub-system may monitor the vicinity of the structure. The vicinity may extend from the structure to an outer range limit of one or more sensors of the projectile sub-system.

At 802, it is determined if an incoming projectile has been detected. For example, a control unit of the projectile tracking sub-system may monitor the sensor(s) to determine if a projectile is within the vicinity of the structure. If an incoming projectile has not been detected, the method returns to 800.

If, however, an incoming projectile has been detected, the method proceeds from 802 to 804, in which a location of an impact (such as a projected imminent impact) of the projectile on the structure is determined based on a current vector of the projectile. For example, the control unit of the projectile tracking sub-system may continually monitor the vector (that is, the magnitude and direction) of the projectile to determine and continually update a projected impact location.

In response to the location of the impact being determined, one or more electromagnets of one or more armor modules at and/or near the location of the impact are activated at 806. For example, an armor assembly may receive an impact signal from the projectile tracking sub-system and activate the electromagnet(s) at and/or near the location of the impact.

At 808, in response to the electromagnet(s) being activated, one or more shielding barriers are formed at the location of the impact. For example, as the electromagnet(s) are activated, shielding particles are attracted thereto, and coalesce to form one or more hardened shielding barriers.

At 810, it is determined if the threat of the projectile has abated. If not, the method returns to 806. If the threat has abated, the method proceeds from 810 to 812, in which the electromagnet(s) are deactivated. As the electromagnet(s) are deactivated, the shielding particles decouple from one another and the electromagnet(s), thereby deforming or disintegrating the shielding barrier(s). The method then returns to 800.

As described above, embodiments of the present disclosure provide a shielding system and method that may include one or more electromagnets. In operation, the electromagnet(s) may be energized in a projectile impact zone. The electromagnets are easily replaceable. As such, if a particular electromagnet is damaged, it may be removed and replaced, as opposed to replacing an entire armor assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for adaptively shielding a structure, the system comprising:
   an armor assembly comprising one or more armor modules, wherein each of the one or more armor modules comprises one or more electromagnets coupled to a housing that retains a plurality of shielding particles, wherein the one or more electromagnets are configured to be activated in response to an impending threat of a projectile impact, wherein the plurality of shielding particles are attracted to the one or more electromagnets to form a shielding barrier in response to activation of the one or more electromagnets, wherein the shielding barrier is configured to absorb at least a portion of a force of the projectile impact.

2. The system of claim 1, further comprising:
   a projectile tracking sub-system including one or more sensors that are configured to detect a projectile and determine a location of the projectile impact,
   wherein one or both of the projectile tracking sub-system or the armor assembly includes at least one control unit that is configured to one or both of determine the location of the projectile impact and activate the one or more electromagnets proximate to the location of the projectile impact.

3. The system of claim 2, wherein the at least one control unit is configured to selectively activate and deactivate the one or more electromagnets based on a presence of the impending threat of the projectile impact.

4. The system of claim 2, wherein the one or more sensors comprises one or more of a radar sensor, a heat sensor, or an optical sensor.

5. The system of claim 1, wherein the one or more armor modules comprises a plurality of armor modules covering or forming an exterior of the structure.

6. The system of claim 1, wherein the one or more electromagnets comprises a plurality of electromagnets.

7. The system of claim 1, wherein the plurality of shielding particles comprises a plurality of magnetic metal particles.

8. The system of claim 1, wherein the structure comprises an aircraft.

9. The system of claim 1, wherein the structure comprises a land vehicle or water vehicle.

10. The system of claim 1, wherein the structure comprises body armor configured to be worn by an individual.

11. A method of adaptively shielding a structure, the method comprising:
    activating one or more electromagnets in response to an impending threat of a projectile impact;
    attracting a plurality of shielding particles to the one or more electromagnets in response to the activating operation; and
    forming a shielding barrier with the plurality of shielding particles through the attracting operation, wherein the shielding barrier is configured to absorb at least a portion of a force of the projectile impact.

12. The method of claim 11, further comprising:
    detecting a presence of a projectile in a vicinity of the structure with one or more sensors; and
    determining a location of the projectile impact based on the detecting operation, wherein the activating operation comprises activating the one or more electromagnets proximate to the location of the projectile impact.

13. The method of claim 11, further comprising selectively activating and deactivating the one or more electromagnets based on a presence of the impending threat of the projectile impact.

14. The method of claim 11, wherein the one or more armor modules comprises a plurality of armor modules covering or forming an exterior of the structure.

15. The method of claim 11, wherein the one or more electromagnets comprises a plurality of electromagnets.

16. The method of claim 11, wherein the plurality of shielding particles comprises a plurality of magnetic metal particles.

17. The method of claim 11, wherein the structure comprises one of an aircraft, land vehicle, water vehicle, or body armor configured to be worn by an individual.

18. A system comprising:
 a structure;
 an armor assembly comprising a plurality of armor modules covering or forming an exterior of the structure, wherein each of the plurality of armor modules comprises a plurality of electromagnets coupled to a housing that retains a plurality of shielding particles including a plurality of magnetic metal particles, wherein the plurality of electromagnets are configured to be activated in response to an impending threat of a projectile impact, wherein the plurality of shielding particles are attracted to at least one of the plurality of electromagnets to form a shielding barrier in response to activation of the at least one of the plurality of electromagnets, wherein the shielding barrier is configured to absorb at least a portion of a force of the projectile impact; and
 a projectile tracking sub-system including one or more sensors that are configured to detect a projectile and determine a location of the projectile impact,
 wherein one or both of the projectile tracking sub-system or the armor assembly includes at least one control unit that is configured to one or both of determine the location of the projectile impact and activate the at least one of the plurality of electromagnets proximate to the location of the projectile impact, wherein the at least one control unit is configured to selectively activate and deactivate the one or more electromagnets based on a presence of the impending threat of the projectile impact.

19. The system of claim 18, wherein the one or more sensors comprises one or more of a radar sensor, a heat sensor, or an optical sensor.

20. The system of claim 18, wherein the structure comprises an aircraft.

\* \* \* \* \*